June 28, 1932.   K. K. PALUEFF   1,865,273
PROTECTIVE ARRANGEMENT
Filed Feb. 10, 1930
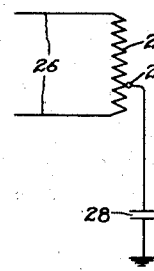
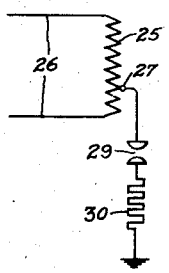
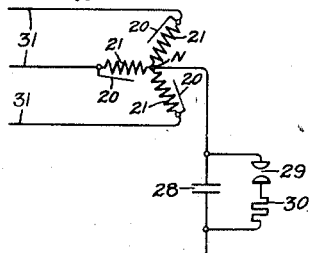
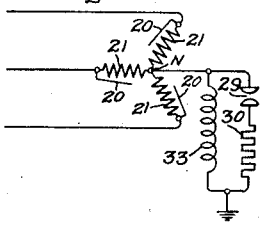
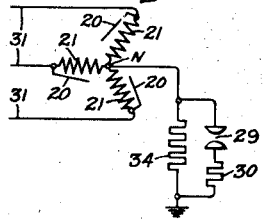
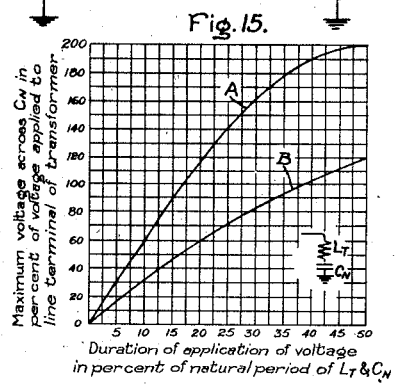
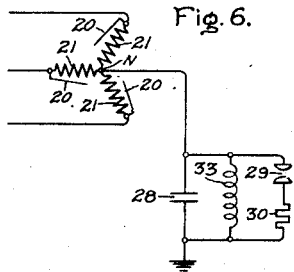
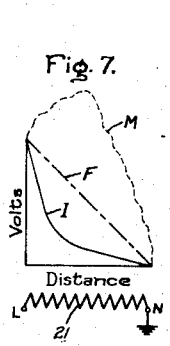
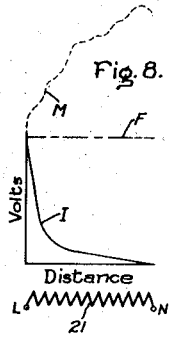
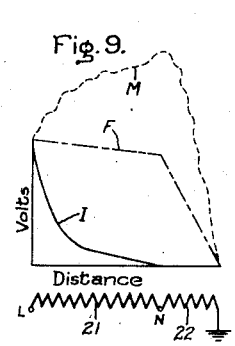
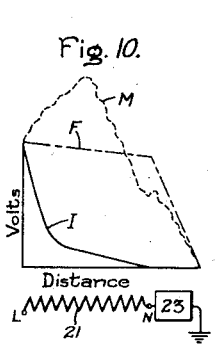
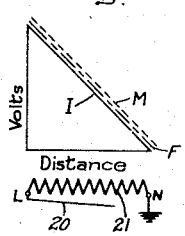
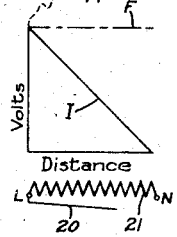
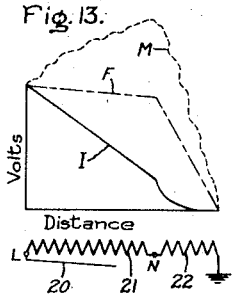
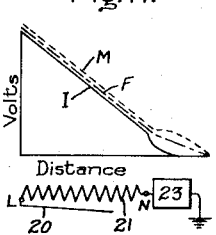
Inventor:
Konstantin K. Palueff,
by Charles E. Mullen
His Attorney.

Patented June 28, 1932

1,865,273

UNITED STATES PATENT OFFICE

KONSTANTIN K. PALUEFF, OF PITTSFIELD, MASSACHUSETTS, ASSIGNOR TO GENERAL ELECTRIC COMPANY, A CORPORATION OF NEW YORK

PROTECTIVE ARRANGEMENT

Application filed February 10, 1930. Serial No. 427,315.

My invention relates to improvements in protective arrangements for electric systems and more particularly to improvements for protecting the windings of inductive apparatus, such as dynamoelectric machines, transformers and especially transformers of the so-called shielded winding or non-resonating type, under transient conditions arising from lightning discharges, switching surges and the like. An object of my invention is to provide an improved protective arrangement for an electric system so that it can be operated with inductive windings grounded through any desired impedance to currents of the operating frequency without subjecting the windings to excessive voltages under transient conditions.

My invention will be better understood from the following description when considered in connection with the accompanying drawing and its scope will be pointed out in the appended claims.

In the accompanying drawing, Figs. 1 to 6 inclusive illustrate diagrammatically different embodiments of my invention; Figs. 7 to 10 inclusive are typical curves, representing under different conditions of connection, the initial, final and maximum voltage distributions in an ordinary or unshielded transformer subjected to a transient condition, Fig. 10 representing the voltage condition when the transformer is grounded through apparatus embodying my invention; Figs. 11 to 14 inclusive are similar to Figs. 7 to 10 respectively except that the transformer is of the shielded or non-resonating type; and Fig. 15 shows curves explanatory of my invention.

In the United States for several years, the trend in the electrical art has been away from the isolated to the solidly grounded neutral. Following this trend, there was developed in the transformer field what is known to the art as the shielded winding or non-resonating transformer whereby under transient conditions a better voltage distribution is secured throughout the windings. Transformers of this type are disclosed in United States Letters Patent 1,511,717 to L. F. Blume et al., 1,585,448 to J. M. Weed and 1,741,200 to K. K. Palueff; all assigned to the assignee of this application. Such transformers, under transient conditions, operate best when the neutral is solidly grounded. With the growth of interconnection of electric systems, the question of stability in case of ground faults has become exceedingly important since it is very desirable that synchronous machines remain in synchronism. To this end the voltage in case of a ground fault must be maintained. One way this can be done is to limit the flow of current in the neutral to ground connection. This means more or less impedance in the neutral to ground connection to fault currents of operating frequency, that is the neutral is isolated to the desired or necessary extent for such frequency currents. This also reduces the duty of the circuit breakers. Then whether the transformer is non-resonant or otherwise, disturbances at operating frequency do not cause excessive voltages but transient disturbances such as lightning discharges, switching surges and the like cause a transient rise in the neutral voltage and thus dangerous oscillations. To insulate against such voltages is costly and may often be impractical. In accordance with my invention, I provide means whereby for currents of operating frequency it is possible economically to isolate the neutral to the desired extent without sacrificing the safety of the transformer under transient voltage conditions.

In order better to understand the problem and also the objects of my invention, I will first explain Figs. 7 to 14 inclusive. In these figures, the horizontal full lines represent the distance axis, that is the distance along the winding arrangements shown schematically below the respective horizontal lines and the vertical full lines represent the voltage axis. Characteristic initial, final and maximum transient voltage distributions in the different winding arrangements are represented respectively by the full line curves marked I, the dash and dot line curves marked F and the dotted line curves marked M. Figs. 7 to 10 show characteristic voltage distributions for the usual or unshielded winding transformer while Figs. 11 to 14 apply to shielded winding transformers, the shield being indicated by the line 20. In each case the voltage due to a transient applied to the line terminal or left-hand end of the transformer winding 21 is assumed the same, that is equal to the drawn length of the voltage axis and the voltages are with respect to ground. In these figures L represents the line terminal and N the neutral.

A circuit will pass through a transient state if the distribution of voltage in the circuit at the instant immediately following a sudden application of potential is different from the final distribution after the potential has been maintained for some length of time. The transient is, therefore, the readjustment of local potentials from their initial to their final values. During the transient the potential of any point of the circuit with respect to either terminal of the winding changes by an amount equal to several times the difference between its initial and final values, the rate of change depending on the time constant of the circuit. Depending on the difference between the initial and final voltages of a point, its voltage during the oscillation may or may not rise above the value of the voltage applied to the terminals of the entire circuit. From Figs. 7–10, 12 and 13, it is clear that for the arrangements shown the maximum values of the voltage on the transformer winding 21, either in whole or in part, exceed the final voltages, while in Figs. 11 and 14 the maximum and final voltages are alike. Referring again to Figs. 7–10, 12 and 13, since the initial and final voltage distributions are different, the voltage throughout the winding will readjust itself from the initial to the final value through a complex oscillation. The line of final voltage distribution will serve as the line of equilibrium or axis for the oscillation, the amplitude of the oscillation of each point being dependent on the difference between the initial and final voltage distributions.

In power transformers having unshielded windings the initial voltage distribution produced by a traveling wave of steep front is practically the same whether the neutral is solidly grounded as in Fig. 7 or more or less isolated as in Figs. 8, 9 and 10. This occurs because at the first moment the voltage concentrates across the line end of the winding. The voltage drop across a considerable part of the winding near the neutral end is a small fraction of the total applied voltage. Obviously, whether the neutral is grounded or isolated is of practically negligible effect so far as the initial voltage distribution is concerned.

The final voltage distribution of the transformer with isolated neutral differs greatly from that of the transformer with a grounded neutral. This will at once be apparent by comparison of Figs. 8, 9, 10, 12 and 13 with Figs. 7, 11 and 14. Assuming that the traveling wave is unidirectioned and only slightly damped, the effect of this wave on the transformer after its crest voltage is reached is similar to direct current. This is the most common form of wave on transmission lines as a result of lightning discharges. With such waves, especially if of steep front, all points of an isolated winding finally acquire a potential above ground equal to the applied terminal voltage as is shown in Figs. 8 and 12. In case the neutral is grounded through some impedance, the final voltage may be lower than the applied voltage as shown by Figs. 9, 10 and 13. If the neutral of a winding is solidly grounded, the final voltage of various points is proportional to the turns between these points and the neutral as shown in Figs. 7 and 11.

The amplitude of the average switching transient is about half that of the average lightning transient but the switching transient is a damped oscillation and produces forced or cumulative oscillations in transformer windings. Consequently, the amplitudes of the internal oscillations increase with each succeeding half cycle of the switching transient and, although the terminal voltage is reduced one-half in comparison with lightning disturbances, the internal voltages are, in terms of the terminal or applied voltage, at least double. The high ratio between applied and internal voltages is the result of resonance between the frequency of the switching surge and some one or more of the natural frequencies of the transformer. The result is that the absolute values of internal stresses produced by an average lightning or switching transient are about the same.

It will be observed from Fig. 7 that, with the ordinary unshielded winding transformer having its neutral N solidly grounded, the voltages to which more or less of the winding 21 is subjected in case of transient voltage surges generally exceed the transient applied voltage. With the transformer winding 21 shielded as in Fig. 11 and the neutral grounded, the initial, final and maximum voltage distributions are the same and the voltages are proportional to the number of turns from the grounded terminal. If the neutral N is ungrounded as in Figs. 8 and 12, then the maximum voltage greatly exceeds the applied voltage and at the neutral in case of the unshielded winding transformer, it may be twice the applied voltage. With the neutral N grounded through a resistance or an inductance 22 as in Figs. 9 and 13 then, depending on the impedance thereof, the maximum voltage at the neutral generally exceeds the applied voltage although, as in the case of the completely isolated neutral, the maximum voltage of the neutral for the shielded transformer is less than that for the unshielded transformer.

In order to prevent these excessive voltages, particularly at the neutral, I provide a neutral impedance device 23 indicated schematically in Figs. 10 and 14. In accordance with my invention this impedance means is electrically so dimensioned that the potential from the neutral point to ground produced by a transient voltage applied to the line terminal of the winding 21 and exceeding the normal voltage to ground of said terminal will not exceed by a predetermined amount the operating frequency voltage of the neutral on the occurrence of a ground fault on the system. It will be observed from Figs. 10 and 14 that the maximum voltages especially for the neutral are held to much lower values than with the arrangements shown in Figs. 8, 9, 12 and 13 and in the case of the shielded transformer of Fig. 14 the initial, final and maximum voltage distributions are uniform and are maintained substantially alike, as in the shielded transformer when solidly grounded. Thus with a shielded transformer and grounding device embodying my invention, it is possible to keep down the internal oscillations as well as the neutral voltage, since my neutral impedance device does not interfere with the intended function of the shield.

If a transformer grounded through a resistance be subjected to a traveling wave, two essentially different transients occur. One transient is exponential and depends upon the transformer acting as a pure inductance while the neutral resistance and the surge impedance of the line act as pure resistances. The other transient is the oscillation of the transformer winding which, in effect, comprises a plurality of interconnected inductances and capacitances. If now Z is the surge impedance of the transmission line, $L_T$ the inductance of the transformer and $R_N$ the neutral resistance, then at the instant immediately following the impact of the traveling wave the entire voltage appears across the transformer and the initial distribution is the same as in a solidly grounded transformer as shown by curves I of Figs. 7 and 9. With the applied voltage E maintained indefinitely by the traveling wave, the final voltage across the transformer becomes zero and the applied voltage divides between Z and $R_N$ in proportion to their relative values. The final voltage across $R_N$ is $E_N = E\dfrac{R_N}{Z+R_N}$.

The transient voltage across the resistance rises exponentially from zero to the value $E_N$ at a rate depending on $$\dfrac{L_T}{Z+R_N}.$$

With respect to the internal oscillation it is known that, inasmuch as the surge impedance of transmission lines is of the order of a few hundred ohms its effect can be neglected.

With the neutral isolated, the winding potentials rise under the influence of a traveling wave above applied voltage. The rate of this rise depends on the natural frequencies of the winding. The rate of rise is greater at the neutral than at other points of the winding. With the neutral grounded through resistance, the rate of rise of the neutral voltage depend upon $$\dfrac{L_T}{Z+R_N}.$$

If this rate is approximately as high as for the isolated neutral, the presence of resistance has practically no effect on the maximum voltages to ground created throughout the winding by the oscillation. If it is lower, the presence of resistance tends to lower these voltages. The effect of resistance is greatest at the neutral point and near the line end is small. Thus the slower the exponential transient the more the transformer acts as if its neutral were solidly grounded.

Since the final neutral voltage $E_N$ due to the exponential transient is $$E\dfrac{R_N}{Z+R_N},$$

then if Z is of the order of 300 ohms, an appreciable voltage may finally appear at the neutral if the traveling wave is long enough. Just what percentage of $E_N$ a given wave will produce depends on the length of the wave and the rate $$\dfrac{L_T}{Z+R_N}$$

of the transient. Thus, with a given length of the wave it is possible to limit the voltage of the neutral to any desired fraction of $E_N$ by choosing $R_N$ of the proper value. However, in so doing the value of $R_N$ is quite likely to be too small to limit the neutral current to the desired value on the occurrence of a line to ground fault.

With the transformer grounded through an inductance, the initial voltage distribution will be the same as in the case of a solidly grounded transformer as shown by the curves I in Figs. 7 and 9. The final voltage $E_N$ at the neutral for an indefinitely long wave will be $$E\frac{L_N}{L_N+L_T},$$

$L_N$ being the neutral inductance. Obviously, with a given transformer, the greater the neutral inductance is made the higher the final neutral voltage will be. The values, however, will be less than $$E\frac{L_N}{L_N+L_T}$$

if the wave length of the applied voltage is shorter than one-half the period of oscillation of the neutral. The axis of the transformer internal oscillation for final voltage distribution is a straight line connecting the potential of the line terminal with the final potential $E_N$ of the neutral as shown by F in Fig. 9.

The transformer effective inductance $L_T$ depends on the number of transformers in a given bank that are simultaneously subjected to a surge. When all three transformers are simultaneously subjected to a surge, $L_T$ is the short-circuit inductance of the transformers. In case only one transformer is subjected to a surge, $L_T$ is the open-circuit inductance.

Referring now to the embodiment of my invention illustrated in Fig. 1, an inductive winding 25 which may be a generator or transformer winding or the like is connected in a single-phase circuit including line conductors 26. A point 27 of the winding 25 is connected to ground through a capacitance 28. The reactance of the capacitance 28 is such as to insure that, with a transient voltage applied at a line terminal of the winding 25 the voltage rise of the point 27 does not exceed a predetermined percentage of the applied voltage. The initial voltage distribution along the winding 25 is the same as in a solidly grounded transformer, q. v. Fig. 7. If the wave is indefinitely long, the final voltage of the point 27 is equal to the applied voltage. With a constant voltage suddenly applied and maintained at a terminal of the transformer, the voltage across the capacitance will start to oscillate in very much the same manner as if the transformer winding were acting as a pure inductance. The voltage across the capacitance beginning with zero oscillates with an amplitude equal to the applied voltage about a point of equilibrium which is above ground by this voltage. Neglecting the surge impedance of the line the frequency of the oscillation is $$f=\frac{1}{2\pi\sqrt{L_TC_N}},$$

if $C_N$, the capacitance in the ground connection is large in comparison with the transformer electrostatic capacitance. In addition to this oscillation the entire winding 25 will oscillate at its natural frequencies as previously discussed.

In accordance with my invention, I make the capacitance 28 large enough to lower the frequency $f$ so that the voltage at the point 27 at the end of $t$ micro-seconds rises to only a definite percentage of the applied voltage. In this case the internal oscillation will be practically the same as if the point 27 were solidly grounded. If, however a small capacitance is used then in a shorter time the voltage of the point 27 reaches a value comparable to the applied voltage and the transformer oscillation will approach that of the transformer with isolated neutral. The curves of maximum voltages to ground occurring during $t$ micro-seconds are similar in appearance to the curve of Fig. 7 for high capacitance, Fig. 9 for medium capacitance and Fig. 8 for low capacitance.

Within practical limits the capacitance $C_N$ in the ground connection can be made large enough for the maximum length of wave expected in practice so as to limit the voltage of the point 27 to any desired percentage of the applied voltage. Fig. 15 shows the relation between the maximum voltage across the capacitance $C_N$ and the ratio of the duration of the application of the voltage, of the natural period $f$ of the transformer winding 25 and the capacitance 28. This voltage depends not only on this ratio but also on the shape of the wave of the applied voltage, for example curve A applies to a rectangular wave while curve B applies to a triangular wave. Therefore, it is possible, in accordance with my invention, properly to choose the grounding impedance in order to have the transformer behave under finite traveling wave excitation as if it were practically solidly grounded.

Instead of grounding the point 27 of the transformer winding 25 through the capacitance, I may ground it through an arrangement embodying a gap 29 or a resistance 30 or both. The gap 29 may be of any suitable type examples of which are well known to the art but I may use a vacuum gap which embodies cold electrodes and in which ionization plays no part in the break down. Such a device is disclosed in British Patent 344,092. The gap 29 will be set to arc over at the desired voltage which must not be exceeded. It will, however, have a setting such as to prevent maintaining any power arc with the operating frequency voltages expected. The resistance 30 may be of any suitable type but it must be free of appreciable inductive effects. For the resistance 30, I may use one having a negative ampere characteristic with no time lag. Such a resistance is disclosed in United States Letters Patent 1,822,742, dated September 8, 1931. Such a resistance would readily permit the flow of the high voltage transient currents and yet offer considerable resistance to the operating frequency current so as to assist in extinguishing the arc over the gap 29 if both are used. The arrangement of Fig. 2 is particularly adapted to take care of transients of long wave length.

With capacitance alone in the ground connection, the size, and therefore, the cost of the condenser is determined by the length of the traveling wave for which provision must be made. This is apparent since the longer the wave the lower the frequency of the circuit between a terminal of the winding 25 and ground must be made to keep the voltage of the point 27 below a predetermined value, as shown by Fig. 15, and therefore the greater the condenser capacity to be provided. Moreover, due to the possibility of resonance at the frequency $f$ of the transformer inductance and the capacitance of the ground connection, large currents may flow in the capacitance $C_N$. Because of this possibility of a series resonant circuit, the voltage across the capacitance 28 may rise to values in excess of those for which the point 27 of the transformer is insulated. Inasmuch as the arrangement shown in Fig. 2 is particularly applicable in connection with long waves, it may be combined with the arrangement shown in Fig. 1 to eliminate these possibilities.

In Fig. 3, I have shown such a combination arrangement in the neutral to ground connection of a polyphase transformer having windings 21 connected in a polyphase circuit including conductors 31. By a polyphase transformer, I mean either what is commonly known as such or a bank of single-phase transformers in polyphase connection. While I have shown the transformer in Fig. 3 as having its windings provided with shields 20, my invention is not so limited and the transformer may be of the usual type having unshielded windings. In the connection to ground from the neutral N is the capacitance 28 and connected in parallel therewith is the by-pass resistor 30 in series with the gap 29 or either one alone.

With this arrangement for currents of operating frequency, the neutral N is practically isolated. The capacitance 28 is of such a value as to prevent the voltage rise of the neutral above the desired amount for transient wave lengths up to some predetermined value. The value of the capacitance 28 may be such that the transient voltage strain at the neutral does not exceed the voltage strain caused by the specified high potential test at operating frequency. For wave lengths greater than those for which the capacitance 28 is chosen, that is after it is charged, and also for the series resonant condition either of which would cause the voltage across the capacitance 28 to rise above the desired value, the gap 29 will break down and the by-pass resistance 30 take care of the transient discharge. While I have shown both the gap 29 and the by-pass resistor 30 connected across the capacitance 28 either one of these devices alone may be used. If the gap alone is used its characteristic must be such as to prevent a destructive flow of power currents of operating frequency. If the resistance 30 alone is used it has preferably a negative ampere characteristic as heretofore described so that to power currents of operating frequency voltage it would present a high resistance and to high voltage transient discharges a very low resistance. With the arrangement shown in Figs. 1, 2 and 3 it will be obvious that the point 27 or N of the transformer is practically isolated for currents of operating frequency.

In case it is desired to have the neutral point N not completely isolated but grounded through an impedance which will limit the currents of operating frequency in case of line to ground faults to some desired value, I may use an inductance 33 as shown in Fig. 4 or a resistance 34 as shown in Fig. 5. In parallel with either of these, I may use either the gap 29 or the by-pass resistor 30 or both. If the gap 29 is omitted, the by-pass resistor is preferably of the negative ampere characteristic type. If the gap 29 alone is used its characteristic must be such as to prevent a destructive flow of power currents of operating frequency. The power current limiting resistor 34 may be of any suitable type, examples of which are well known in the art. Thus, with either of the arrangements of Figs. 4 and 5, the impedance at operating frequency may be any desired value while the impedance at transient voltage frequencies is very low when no gap is used and after the gap, if used, arcs over.

In Fig. 6, I have illustrated what I now consider to be the preferred embodiment of my invention for controlling the neutral transient voltage. In this case, I connect in parallel in a neutral to ground connection a capacitance 28, an inductance 33 and a resistance 30 or a spark gap 29 or both in series. The capacitance 28 and the resistance 30 are so dimensioned that the neutral voltage does not rise above a predetermined proportion of the transient applied voltage irrespective of the type of line transient. At present, I consider it satisfactory if the voltage strain at the neutral due to transients, does not exceed the voltage strain caused by the specified high potential test at operating frequency. The impedance of the ground connection as a whole to currents of operating frequency is such as to limit these currents in case of line to ground faults to a predetermined value. Since the capacitance 28 decreases the rate of rise of the neutral voltage produced by any surge, it is preferably so chosen as to make the rate of rise so slow in comparison with the natural frequency of the transformer that the transformer winding oscillates as if it were solidly grounded. In this connection a comparison of the curves of Fig. 10 with Fig. 7 of the unshielded transformer and Fig. 14 with Fig. 11 for the shielded transformer will show the similarity of the transient voltage disturbances on the transformer.

Inasmuch as the ratio of the reactance of the transformer and the reactances of the devices in the neutral to ground connection varies over a wide range for the different conditions occurring in practice, the values of the capacitance 28 and inductance 33 vary. If the desired resistance 30 is so small that it has an appreciable effect at operating frequency voltage, the gap 29 is placed in series with the resistance 30. The gap setting is, of course, such that it will not arc over at the highest operating frequency neutral voltage. As previously set forth, both the resistance 30 and the gap 29 preferably are such that they do not allow the power current to follow the transient current after the gap is arced over by the transient. In the arrangement shown in Fig. 6 any possibility of resonance between the capacitance 28 and the inductance 33 which would result in a high neutral voltage will be taken care of by the by-pass resistance 30 either alone or in connection with the gap 29.

In case of a line to ground fault the operating frequency neutral voltage rises to a value $e$ depending on the ratio of the reactance in the neutral to the transformer reactance and the reactance of the rest of the system. For this reason the value $e$ is chosen as a criterion for the selection of the constants of the devices in the neutral to ground connection. I may so choose them that the equivalent transient voltage strains do not exceed $2e$ which is the value of the high potential test that the grounding device and the neutral N of the transformer are generally required to withstand.

A shielded winding or non-resonating transformer designed for solidly grounded neutral when grounded through an ordinary resistance or capacitance oscillates very much like an ordinary transformer as shown in Fig. 13. It does so because while its initial voltage distribution is a straight line similar to the voltage distribution of a non-resonating transformer with the neutral solidly grounded, it does not coincide with its final distribution which is the same as that of an ordinary transformer as shown in Fig. 9. It is possible to build a shielded transformer properly combined with an impedance device, according to my invention, such that the initial voltage distribution coincides with the final voltage distribution F as shown in Fig. 14. The circuit of the transformer and ground connection will then be non-resonating. It may be necessary in some cases particularly with non-shielded transformers to increase the capacitance between the line and neutral terminals of the transformer by connecting a condenser across these terminals. In some cases, however, it is uneconomical to build such a transformer especially if the final voltage of the neutral exceeds substantially one-third of the voltage applied to the line terminal. The principle involved is that $L_1C_1=L_2C_2$ where $L_1$ and $L_2$ represent the inductances of the transformer and the ground connection respectively and $C_1$ the effective capacitance between the line and ground terminals of the transformer and $C_2$ the effective capacitance of the ground connection. By effective capacitance, I mean the distributed capacitance of the winding plus whatever concentrated capacitance is employed between the terminals of the winding under consideration. Although $L_1$ and $L_2$ are fixed by conditions, $C_1$ and $C_2$ may have a wide range of values since it is only their ratio that is determined by $L_1$ and $L_2$. Advantage can be taken of this in connection with non-shielded inductive widings to eliminate or reduce some or all of the harmonics of the internal oscillation of the windings so as to reduce the internal voltage stresses. The length of the front of the wave or its duration should equal or exceed the natural period of the lowest harmonic to be eliminated. By suitably choosing the values of $C_1$ and $C_2$ the shape of the applied voltage wave and therefore the length of the front can be brought to the desired value. However, the neutral capacitance may be so chosen that the rate of rise of the neutral voltage will be so low that the finite waves which are found in practice, will not cause the potential of the neutral to exceed a predetermined value, as shown in Fig. 15. The possibility of resonance between the neutral capacitance 28 and the inductance of the transformer as a whole in case of switching transients is prevented by the resistance 30 in parallel with the capacitance. Under these conditions, the transient voltage distribution along the winding will be uniform. Inasmuch as the impedance of the ground connection including the capacitance 28, the inductance 33 and the resistance 30 can be made very high, the transformer may be made to act at operating frequency as if its neutral were isolated.

Where an electric system includes two or more polyphase banks connected to ground, a single device embodying my invention may be placed between the common neutral of these banks and ground and thus take care of transient conditions on any one of the transformers.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. An electric system including a transformer having a neutral and a connection to ground from said neutral including impedance means electrically so dimensioned that the voltage strain at the neutral produced by a transient voltage applied to a terminal of said transformer will bear a predetermined ratio to the voltage strain at the neutral due to the operating frequency voltage of said neutral on the occurrence of a ground fault on the system.

2. An electric system including a transformer having a shielded winding and a ground connection from a point of said winding including in parallel a capacitance, an inductance and a resistance, the capacitance and resistance being so proportioned that the voltage from said point to ground is held to a predetermined value which is less than the transient voltage applied to said winding and the impedance of the ground connection being such as to reduce the current from said point to ground on the occurrence of a ground fault on the system to a predetermined value.

3. An electric system including an inductive winding and a connection to ground from a point of said winding electrically so dimensioned as to insure with voltages of the same magnitude applied at a terminal of said winding a lower voltage rise of said point under transients of greater than the operating frequency of the system than at the operating frequency on the occurrence of a ground fault on the system.

4. An electric system including an inductive winding, and a connection to ground from a point of said winding including impedance means electrically so dimensioned that the potential from said point to ground produced by a transient voltage applied to a terminal of said winding and exceeding the normal voltage to ground of said terminal will not exceed by a predetermined amount the operating frequency voltage of said neutral on the occurrence of a ground fault on the system.

5. An electric system including a transformer having a shielded winding and a ground connection from a point of said winding including in parallel a capacitance and a resistance, the capacitance and resistance being so proportioned that the voltage from said point to ground is held to a predetermined value which is less than the transient voltage applied to said winding.

6. An electric system including an inductive winding, a ground connection from a point of said winding including in parallel a capacitance, an inductance and a resistance, the capacitance and resistance being so proportioned that the voltage from said point to ground is held to a predetermined value which is less than a transient voltage applied to said winding and the impedance of the ground connection being such as to reduce the current from said point to ground on the occurrence of a ground fault on the system to a predetermined value.

7. An electric system including an inductive winding and a connection to ground from a point of said winding including impedance means electrically so dimensioned that the voltage strain at said point produced by a transient voltage applied to a terminal of said winding will not exceed the voltage strain at said point caused by a given high potential test of said point at operating frequency.

8. A polyphase electric system including a polyphase line, a poyphase shielded winding transformer having a neutral and a connection to ground from said neutral including in parallel inductive and capacitive reactances and a resistance and a spark gap in series, the relation of said reactances, resistance and the voltage breakdown of said gap to the constants of the transformer circuit being such that the potential to ground of the neutral produced by a transient voltage applied to a line terminal of the transformer and exceeding the normal voltage to ground of said terminal will bear a predetermined ratio to the operating frequency voltage of the neutral on the occurrence of a line to ground fault.

9. An electric system including a line, a transformer having a winding with one terminal connected to said line and a connection to ground from a point of said winding including in parallel an impedance and a resistance having a negative ampere characteristic, the relation of said impedance and resistance to the constants of the transformer circuit being such that the potential to ground of said point produced by a transient voltage applied to a line terminal of the transformer and exceeding the normal voltage to ground of said terminal will bear a predetermined ratio to the operating frequency voltage of the neutral on the occurrence of a line to ground fault.

10. An electric system including a transformer having a neutral and a connection to ground from said neutral including in parallel a capacitance, an impedance and a resistance, the capacitance and resistance being so proportioned that the voltage from said neutral to ground is held at a predetermined value which is less than the transient voltage applied to said transformer and the impedance of the ground connection being such as to reduce the current from said point to ground on the occurrence of a ground fault on the system to a predetermined value.

11. A polyphase electric system including a polyphase transformer having a neutral and a connection to ground from said neutral including in parallel a capacitance and a resistance and a spark gap in series, said capacitance being proportioned to hold the transient voltages below a predetermined value for a traveling wave below a predetermined length and said resistance and gap being proportioned to offer low impedance to transient currents arising from transient voltages caused by traveling waves exceeding said wave length and of a magnitude sufficient to arc over said gap.

12. An electric system including an inductive winding and a connection to ground from a point of said winding including in parallel a capacitance and a resistance having a negative ampere characteristic electrically so proportioned that the voltage strain at said point produced by a transient voltage applied to a terminal of said winding will not exceed the voltage strain at said point caused by a given high potential test of said point at operating frequency.

13. An electric system including an inductive winding and a connection to ground from a point of said winding including impedance means electrically so dimensioned that the potential from said point to ground produced by a transient voltage applied to the terminal of said winding and exceeding the normal voltage to ground of said terminal will bear a predetermined ratio to the operating frequency voltage of said point on the occurrence of a ground fault on the system.

14. An electric system including an inductive winding and grounding means therefor for reducing certain harmonics of the internal oscillation of said winding due to an applied voltage wave including capacitance means for increasing the length of the front of the wave to a value approximating the natural period of the lowest harmonic to be eliminated.

15. An electric system including an inductive winding and a ground connection therefor including an inductance $L_2$ and a capacitance $C_2$ so proportioned relatively to the inductance $L_1$ and the effective capacitance $C_1$ of the inductive winding that $L_1 C_1$ is substantially equal to $L_2 C_2$.

16. An electric system including a transformer having a shielded winding and a ground connection from a point of said winding including impedance means for limiting ground fault current at operating frequency to a predetermined value, said ground connection being electrically so dimensioned that on the occurrence of a transient voltage applied to a line terminal of the transformer the initial and final voltage distributions are maintained the same.

17. An electric system including an inductive winding and a connection to ground from a point of said winding including impedance means electrically so dimensioned that the relation between the natural period of the circuit between the terminal of said winding and ground and the duration of a transient voltage applied to a line terminal of the winding is such that the voltage from said point to ground does not exceed a predetermined value.

18. An electric system including a transformer having a neutral, a connection to ground from said neutral including in parallel a capacitance, an inductance and a resistance having a negative ampere characteristic electrically so proportioned that the voltage from said neutral to ground is held to a predetermined value which is less than a transient voltage applied to a terminal of said transformer and so as to reduce the current in the neutral to ground connection on the occurrence of a ground fault on the system of a predetermined value.

In witness whereof, I have hereunto set my hand this 8th day of February, 1930.

KONSTANTIN K. PALUEFF.